US00RE39398E

(19) United States
(12) Reissued Patent
Danowski et al.

(10) Patent Number: US RE39,398 E
(45) Date of Reissued Patent: Nov. 14, 2006

(54) APPARATUS AND METHODS FOR COOLING SLOT STEP ELIMINATION

(75) Inventors: Michael J. Danowski, Cincinnati, OH (US); Gulcharan S. Brainch, West Chester, OH (US); Jonathan Phillip Clarke, West Chester, OH (US)

(73) Assignee: General Electric Company, Cincinnati, OH (US)

(21) Appl. No.: 10/858,553

(22) Filed: Jun. 1, 2004

Related U.S. Patent Documents

Reissue of:
(64) Patent No.: 6,062,817
Issued: May 16, 2000
Appl. No.: 09/186,676
Filed: Nov. 6, 1998

(51) Int. Cl.
*F01D 5/18* (2006.01)

(52) U.S. Cl. ..... 416/97 R; 416/229 A; 416/241 R

(58) Field of Classification Search ..... None
See application file for complete search history.

(56) References Cited

U.S. PATENT DOCUMENTS 3,921,271 A * 11/1975 Dennis et al. ..... 29/156.8 H
5,243,759 A * 9/1993 Brown et al. ..... 29/889.721
5,348,446 A * 9/1994 Lee et al. ..... 416/241 R
5,599,166 A * 2/1997 Deptowicz et al. ..... 416/97 R
5,857,837 A * 1/1999 Zelesky et al. ..... 416/97 R

* cited by examiner

*Primary Examiner*—Ninh H. Nguyen
(74) *Attorney, Agent, or Firm*—William Scott Andes; Armstrong Teasdale LLP

(57) ABSTRACT

An airfoil core die includes a tab for forming a continuous and smooth contour and extension of a first trailing edge slot recessed all to a bottom of the airfoil. The contour is formed on each airfoil core at injection and is maintained through to finish casting of the airfoil.

13 Claims, 5 Drawing Sheets

APPARATUS AND METHODS FOR COOLING SLOT STEP ELIMINATION

Matter enclosed in heavy brackets [ ] appears in the original patent but forms no part of this reissue specification; matter printed in italics indicates the additions made by reissue.

BACKGROUND OF THE INVENTION

This invention relates generally to turbine engines and, more particularly, to apparatus and methods for reducing stress on turbine blades.

Turbine blades include an airfoil, a platform, and a shank. The airfoil has a leading edge and a trailing edge, with the trailing edge being relatively thin in comparison to the leading edge. Typically turbine blades are subjected to high temperature gases by a combustor located upstream from the turbine blades. The airfoil trailing edge region is exposed to such high temperature gases and is prone to failure due to difficulties associated with providing adequate cooling to the region.

To facilitate preventing airfoil failure, a plurality of slots are located in the airfoil trailing edge and cool air is discharged from the slots to cool the trailing edge. These slots sometimes are referred to herein as trailing edge slots.

Turbine engine airfoils are cast with land areas, or ribs, located between the trailing edge slots. The slots are formed by a recessed wall and two steps extend between the recessed wall and an outer surface of the airfoil. The step in the slot located closest to the platform may cause a large stress concentration with high terminal stresses present. The high thermal stresses may result in trailing edge axial cracks which can propagate through the airfoil. Premature failure of the turbine blade may result form the axial cracks. However, the trailing edge slot located closest to the airfoil platform cannot be eliminated because removal would result in trailing edge overheating.

Accordingly, it would be desirable to reduce stress on turbine engine blades in the area where the airfoil trailing edge joins the platform. Additionally, it would be desirable to improve the longevity of turbine blades.

BRIEF SUMMARY OF THE INVENTION

These and other objects may be attained by a turbine blade wherein at least a portion of a step between an airfoil trailing edge slot and a platform is eliminated. The airfoil is connected to the platform at a base of the airfoil by a fillet. AN airfoil core die is utilized to cast the turbine blade airfoil which includes a top, a bottom, a leading edge, and a trailing edge.

The airfoil further includes a plurality of trailing edge slots for cooling the trailing edge. The trailing edge slots include a first step and a second step separated by a recessed wall. A first trailing edge slot is the trailing edge slot closest to the juncture of the airfoil and the platform.

More specifically, the die includes a tab positioned such that a continuous and smooth contour is formed from the first trailing edge slot recessed wall to a juncture of the airfoil and the platform at the filled. Once the tab is cast onto the airfoil core die, the first step, which is typically located near the juncture of the airfoil and an airfoil platform, is partially eliminated. The elimination of at least a portion of the step reduces stress concentration, potential early fatigue and blade failure. The step is sometimes referred to herein as a ledge.

Utilizing the above described tab with the airfoil core die improves the longevity and performance of the turbine blade by reducing the fatigue of the airfoil at the first trailing edge slot. The tab provides a consistently smooth and continuous contour from the airfoil first trailing edge slot to the junction of the airfoil and the airfoil platform.

DETAILED DESCRIPTION OF THE INVENTION

Figure 1:
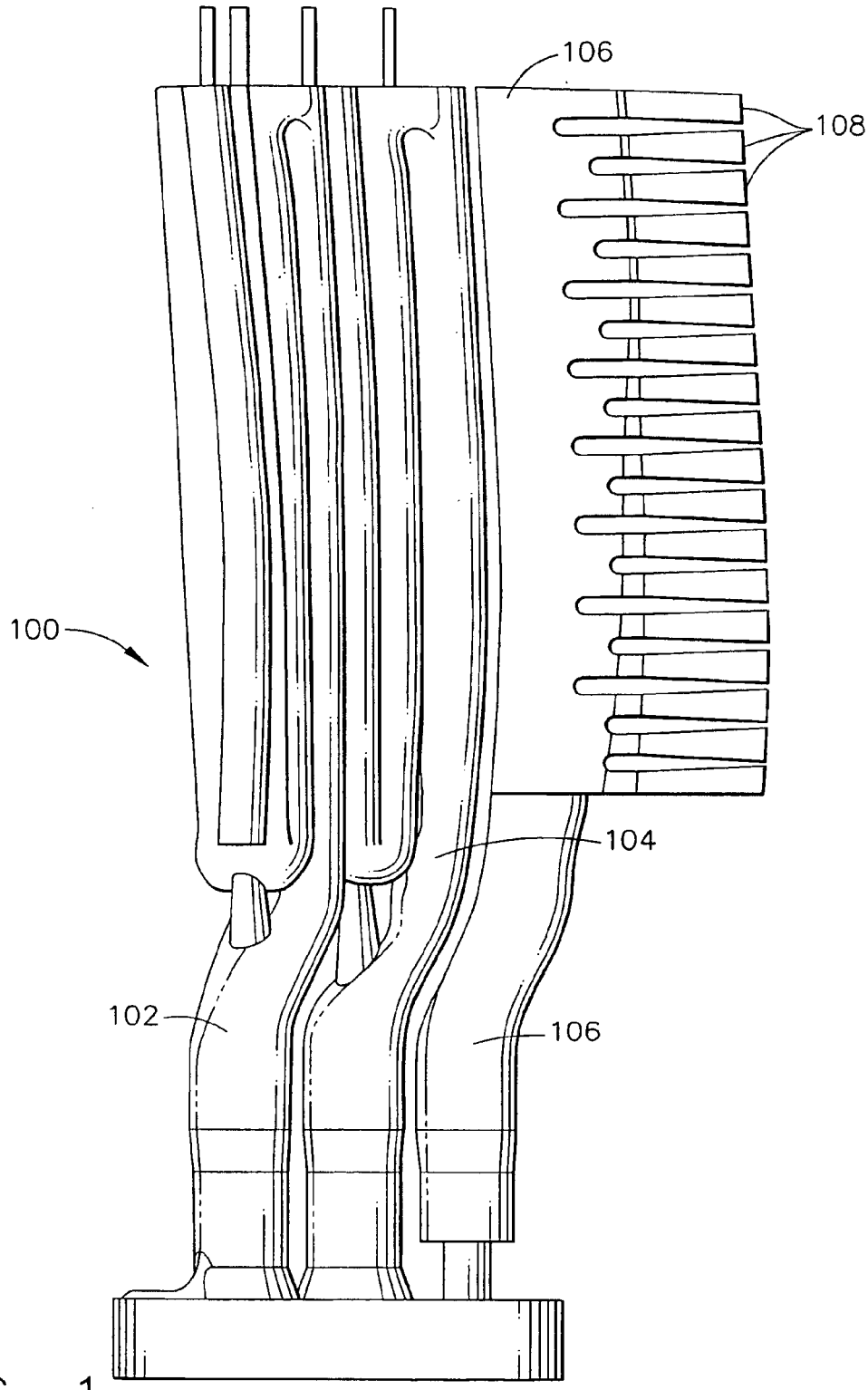
FIG. 1 (PRIOR ART)
FIG. 1 is a schematic view of a known airfoil core die.

FIG. 1 illustrates a known airfoil coil 100 utilized for fabricating turbine blades (not shown). Airfoil core 100 includes a first serpentine cooling channel 102, a second serpentine cooling channel 104, an aft wedge channel 106, and a plurality of fingers 108 extending from aft wedge channel 106.

Airfoil core 100 is fabricated by injecting a liquid ceramic and graphite slurry into core die (not shown). The slurry is heated to form a solid ceramic airfoil core 100. The airfoil core is suspended in an airfoil die (not shown) and hot wax is injected into the airfoil die to surround the ceramic airfoil core. The hot wax solidifies and forms an airfoil (not shown in FIG. 1) with the ceramic core suspended in the airfoil.

The wax airfoil with the ceramic core is then coated with multiple layers of ceramic and heated to remove the wax, thus forming a cavity shell having the shape of the airfoil. The shell is the cured in a heated furnace. Molten metal is then poured into the shell and thus forming a metal airfoil with the ceramic core remaining in place. The airfoil is then cooled, and the ceramic core removed.

First serpentine cooling channel 102 and second serpentine cooling channel 104 form a first serpentine cooling passage (not shown), and a second serpentine cooling passage (not shown), respectively, in the resulting airfoil. Aft wedge channel 106 forms an aft cavity and passage (not shown), and fingers 108 extending from aft wedge channel 106, form a plurality of trailing edge slots (not shown in FIG. 1) in the resulting airfoil.

Figure 2:
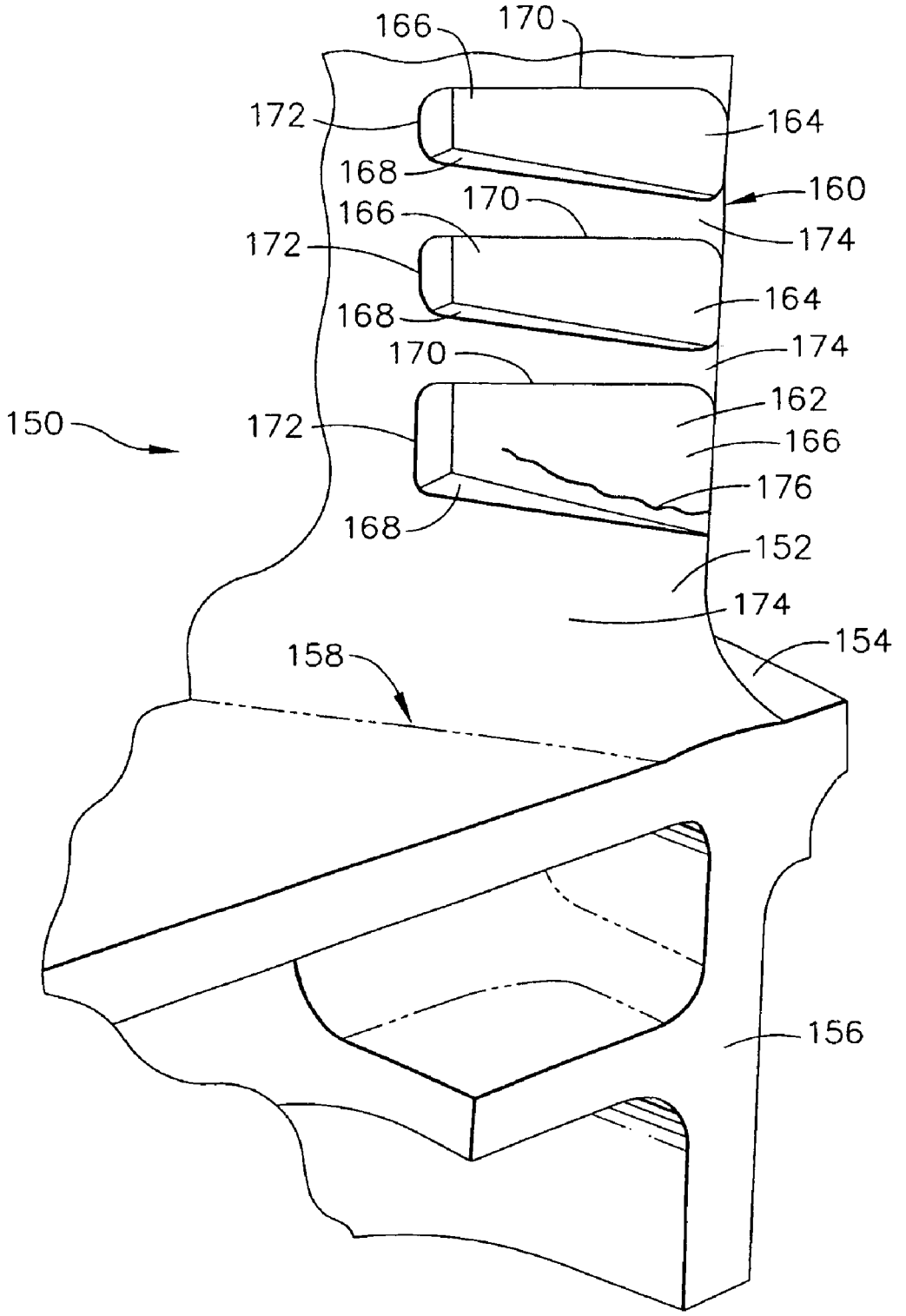
FIG. 2 (PRIOR ART)
FIG. 2 is a schematic view of a partial airfoil cast form the die shown in FIG. 1.

FIG. 2 [illustrated] *illustrates* a portion of a known turbine blade 150 formed using airfoil core 100 shown in FIG. 1. Turbine blade 150 includes an airfoil 152 attached to a platform 154. Platform 154 forms a top portion of a shank 156 and airfoil 152 is secured to platform 154 by a fillet 158. Airfoil 152 has a leading edge (not shown in FIG. 2) and a trailing edge 160. Trailing edge 160 is relatively thin in comparison to the leading edge and is more susceptible to damage from stresses and strains than other areas of airfoil 152 due to the thinness of trailing edge 160.

Due, at least in part, to the thickness of trailing edge 160, a first trailing edge slot 162 and a plurality of other trailing edge slots 164 are formed in airfoil 152 to emit cooling air over trailing edge 160. The cooling air reduces the temperatures, thermal stresses and strains experienced by trailing edge 160. First trailing edge slot 162 is positioned closest to platform 154 in comparison to other slots 164.

Slots 162 and 164 include a recessed wall 166, a first step 168, a second step 170, and a side wall 172 having an opening (not shown) extending therethrough. A plurality of land areas, or ribs 174, separate slots 162 and extend substantially a length of slots 162. First step 168 and second step 170 extend between recessed wall 166 and land areas 174.

First step 168 of slot 162 extends between recessed wall 166 and land area 174 that is between first trailing edge slot 162 and platform 154. Slot 162 may develop one or more trailing edge axial cracks 176 (only one is shown in FIG. 2) due to a large concentration of stresses at slow 162 caused by step 168. Cracks 176 can propagate in airfoil 152 and may lead to a shortened life of turbine blade 150.

Figure 3:
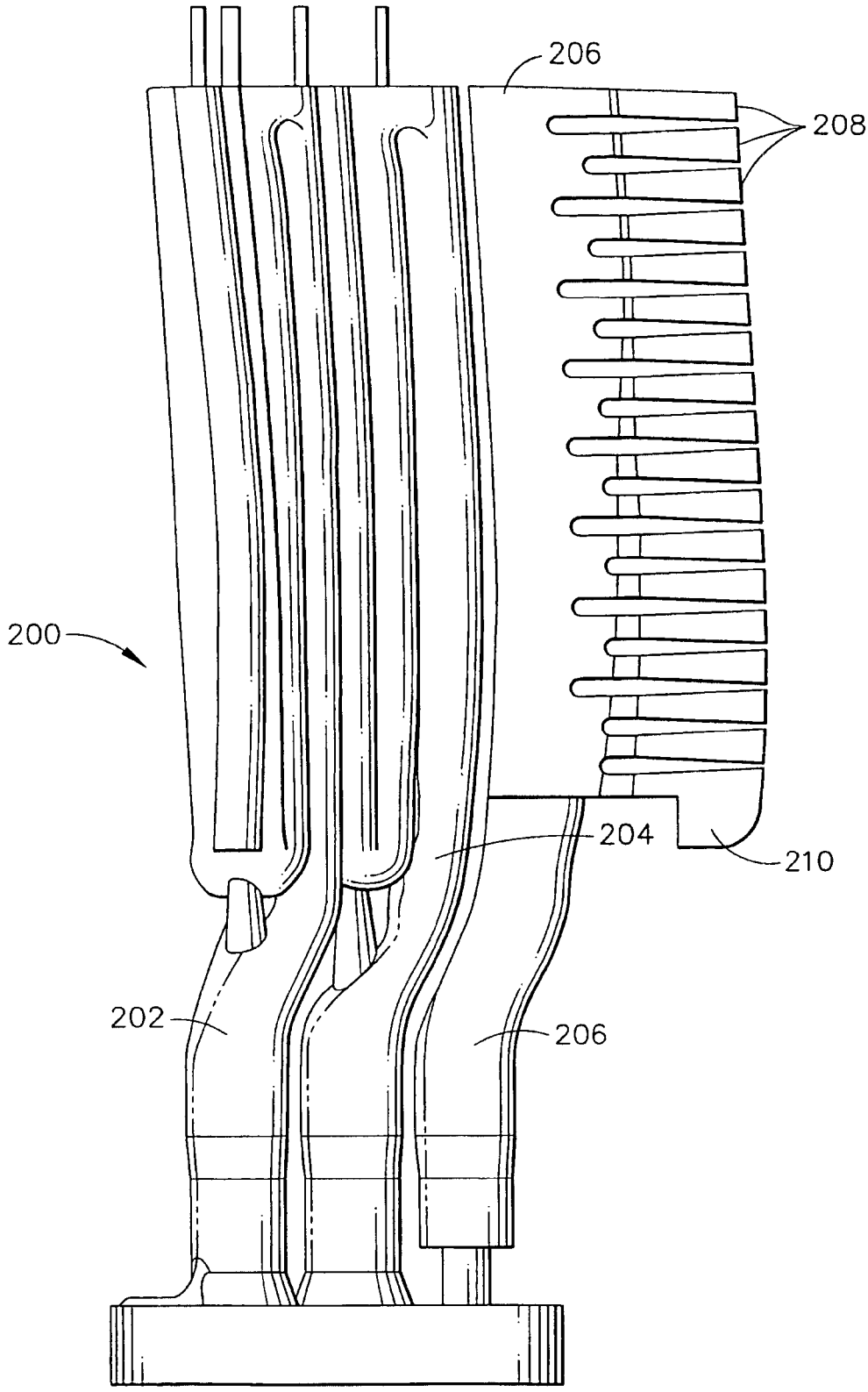
FIG. 3 is a schematic view of an airfoil core die according to one embodiment of the present invention.

FIG. 3 illustrates an airfoil core 200 according to one embodiment of the present invention for a turbine blade (not shown). Airfoil core 200 includes a first serpentine cooling channel 202, a second serpentine cooling channel 204, an aft wedge channel 206, a plurality of fingers 208 which extend from the aft wedge 206, and a tab 210. In one embodiment, tab 210 is located at a bottommost finger 208 and extends below fingers 208 and substantially perpendicular to fingers 208.

Airfoil core 200 is fabricated by injecting a liquid ceramic and graphite slurry into core die (not shown). The slurry is heated to form a solid ceramic airfoil core. First serpentine cooling channel 202 and second serpentine cooling channel 204 form a first serpentine cooling passage (not shown) and a second serpentine cooling passage (not shown), respectively, in a resulting airfoil (not shown in FIG. 3).

Aft wedge channel 206 forms an aft cavity and passage (not shown), and fingers 208, which extend from [the] aft wedge *channel* 206, form trailing edge slots (not shown in FIG. 3) in the resulting airfoil. Tab 210 eliminates at least a portion of a first trailing edge slot step (not shown in FIG. 3) and forms a tapered contour in the resulting airfoil from the first trailing edge slot to a platform (not shown) of the turbine blade.

Tab 210 is formed during core injection and is maintained through to finish casting of the resulting airfoil. In one embodiment, the portion of the first trailing edge slot step that is eliminated is that portion typically extending to the trailing edge.

Figure 4:
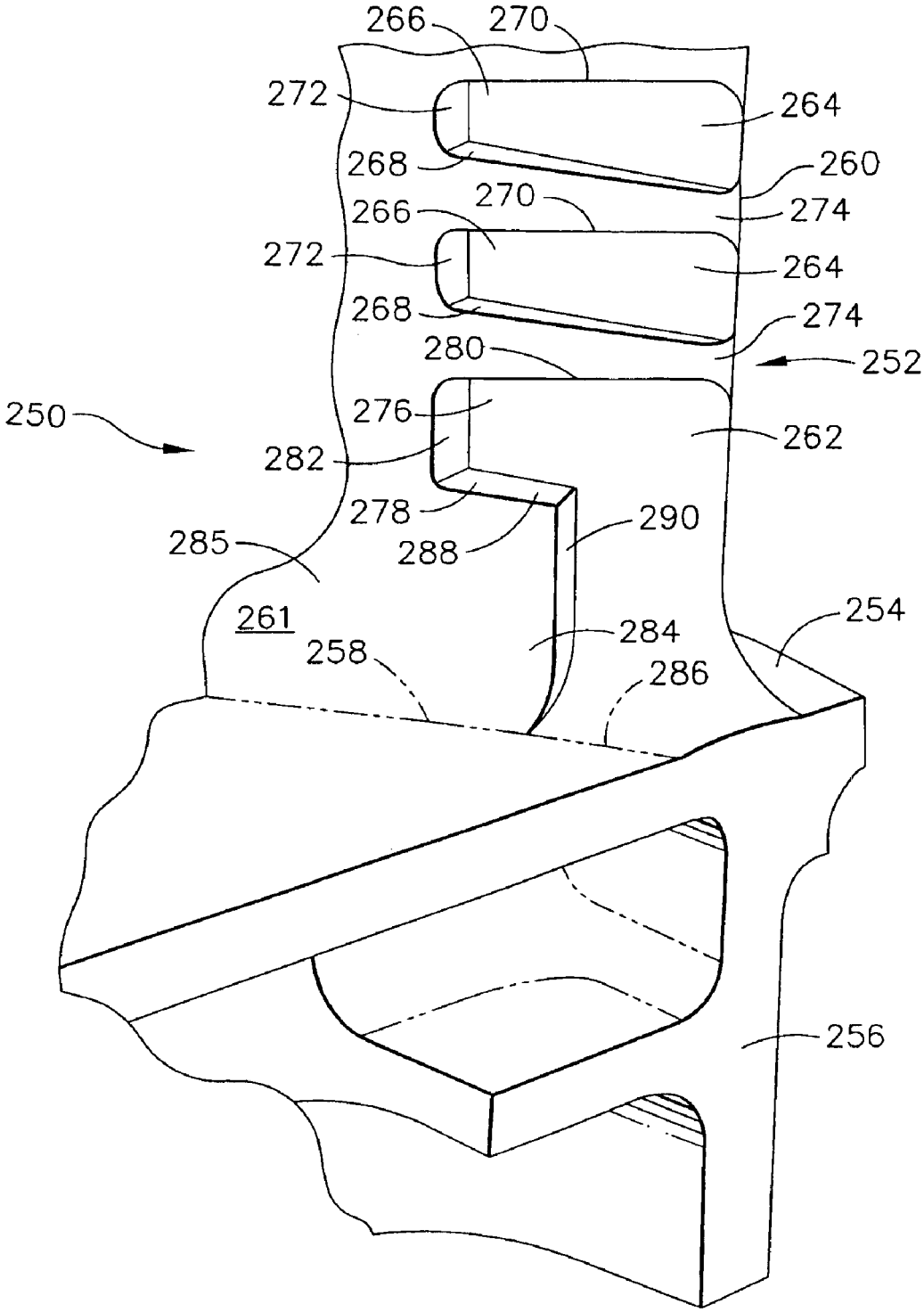
FIG. 4 is a schematic view of a partial airfoil cast from the die shown in FIG. 3.

FIG. 4 illustrates a turbine blade 250 formed using airfoil core 200 shown in FIG. 3. Turbine blade 250 includes an airfoil 252 attached to a platform 254. Platform 254 forms a top portion of a shank 256, and airfoil 252 is secured to platform 254 by a fillet 258. Airfoil 252 has a leading edge (not shown in FIG. 4), a trailing edge 260, a first side wall 261 connecting the leading edge and trailing edge 260 and a second side wall (not shown). Trailing edge 260 is positioned between first side wall 261 and the second side wall.

Airfoil 252 also includes a first trailing edge slot 262 and a plurality of other trailing edge slots 264 that emit cooling air and reduce damage caused by thermal stresses and strains on trailing edge 260. First trailing edge slot 262 is the closest trailing edge slot to the juncture of airfoil 252 and platform 254.

Slots 264 include a recessed wall 266, a first step 268, a second step 270, and a side wall 272 having an opening (not shown) extending therethrough. A plurality of land areas, or ribs, 274 separate slots 264 and extend substantially a length of slots 264. First step 268 and second step 270 extend between recessed wall 266 and land areas 274.

First slot 262 includes a recessed wall 276, a first step, or ledge, 278, a second step, or ledge, 280, and a side wall 282 having an opening (not shown) extending therethrough. First step 278 of slot 262 extends between recessed wall 276 and a first land area 284 positioned between first trailing edge slot 262 and platforms 254. Land area 284 is on an outer surface 285 of first side wall 261.

In one embodiment, recessed wall 276 extends from second step 280 to filled 258 at a bottom 286 of airfoil 252. Recessed wall 276 extends from side wall 282 and the opening extending therethrough to trailing edge 260. Second step 280 extends from side wall 282 and the opening therethrough to trailing edge 260.

First step 278 includes a first portion 288 and a second portion 290. First portion 288 extends from the opening towards trailing edge 260 and is separated from trailing edge 260 by recessed wall 276. Since recessed wall 276 separates first step 278 from trailing edge 260, first step 278 is separated from trailing edge 260 by a distance greater than or equal to a length of at least a portion of recessed wall 276. Second portion 290 extends from first portion 288 to bottom 286 and fillet 258.

By extending recessed wall 276 of first trailing edge slot 262 to fillet 258, a consistent and smooth blend is provided from first trailing edge slot 262 to platform 254. The smooth blend maintains trailing edge slot cooling characteristics of airfoil 252. In addition, the contour of first trailing edge slot 262 reduces stress concentration and early fatigue of airfoil 252.

Figure 5:
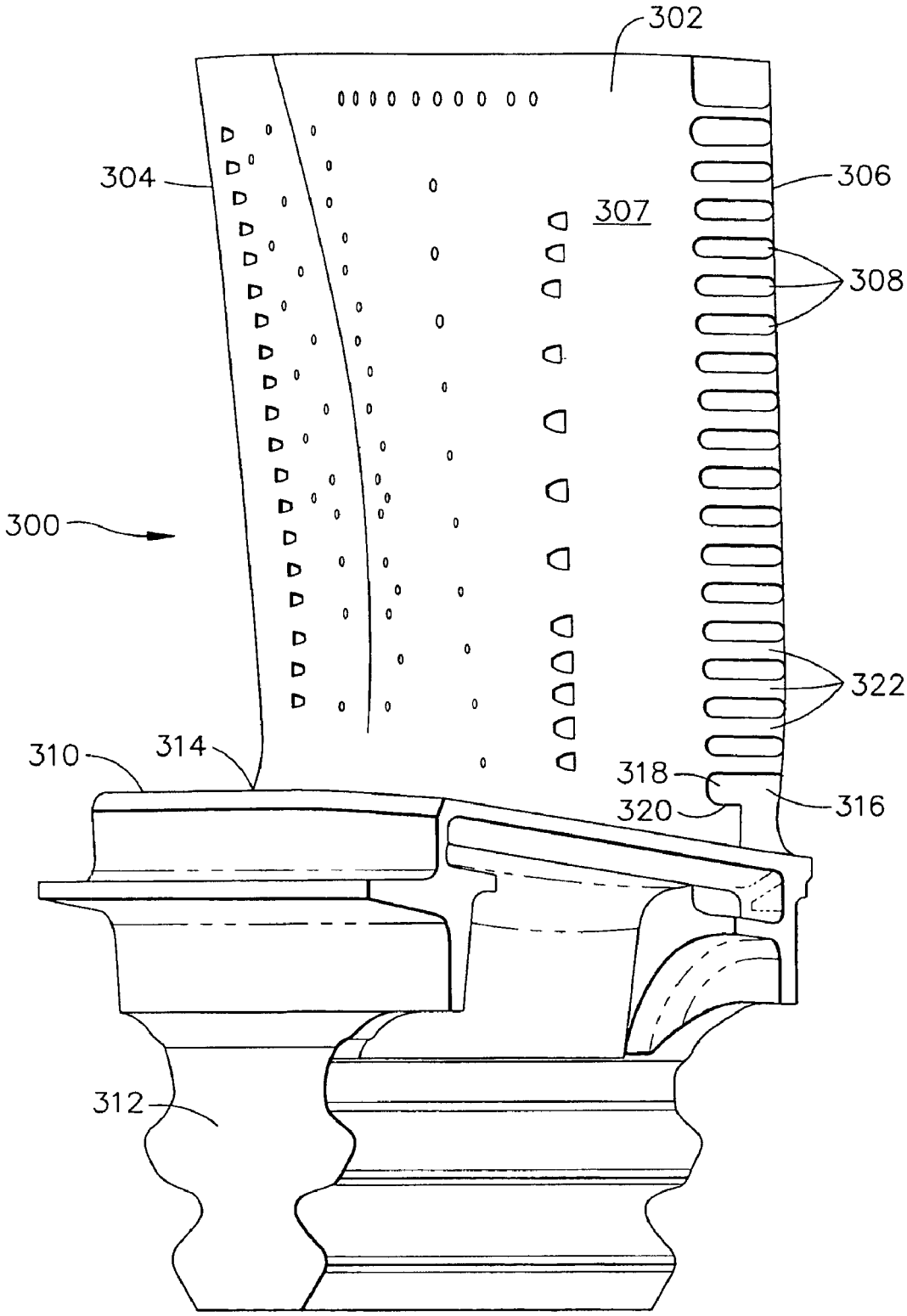
FIG. 5 is a schematic view of a turbine blade incorporating an airfoil cast from the die shown in FIG. 3.

FIG. 5 illustrates a turbine blade 300 including an airfoil 302 having a leading edge 304, a trailing edge 306, and a first wall 307 connecting the leading edge 304 and the trailing edge 306. Trailing edge 306 includes a plurality of trailing edge slots 308 that emit cooling air to reduce thermal stresses and strains experienced by turbine blade 300.

Turbine blade 300 further includes a platform 310 which forms a top portion of a shank 312 that connects turbine blade 300 to a turbine engine rotor (not shown). Airfoil 302 is connected to platform 310 by a fillet 314. A first trailing edge slot 316 includes a recessed wall 318 which extends from a first step 320 to fillet 314. A plurality of land areas 322 separate trailing edge slots 308 from each other.

Thermal stresses and strains which traditionally damage the first trailing edge slot are reduced due to the extension of the recessed wall to the fillet. Cooling air emitted from the first trailing edge slot forms a cooling film that extends from the first step to the fillet along the trailing edge.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A turbine blade for a turbine engine, said turbine blade comprising:

an airfoil comprising a first side wall comprising an outer surface, a second side wall, a leading edge, and a trailing edge, said first side wall outer surface extending between said leading edge and said trailing edge, and trailing edge positioned between said first side wall and said second wall, said first side wall further comprising at least one slot defined by a recessed wall and a slot side wall, said slot side wall comprising an opening extending therethrough, said recessed wall extending between said opening and said trailing edge;

a platform connected to said airfoil; and a fillet connected to said airfoil and said platform, at least a portion of said recessed wall extending to said fillet, said recessed wall [tapered] *is formed integrally with said airfoil during a casting process such that said recessed wall tapers* from said opening to said fillet.

2. An airfoil in accordance with claim 1 further comprising a first ledge extending between said outer surface and said recessed wall, said first ledge separated from said trailing edge by a distance.

3. An airfoil in accordance with claim 2 wherein at least a portion of said recessed wall is positioned between said first ledge and said trailing edge.

4. An airfoil in accordance with claim 2 further comprising a second ledge extending between said outer surface and said recessed wall.

5. An airfoil in accordance with claim 4 wherein said second ledge extends between said opening and said trailing edge.

6. A method for fabricating an airfoil of a turbine blade, said method comprising the steps of:

inserting a mold within a die; and injecting a slurry into the die to form an airfoil that includes a first side including an outer surface, a second side, a leading edge, and a trailing edge, the first side outer surface extending between the leading edge and the trailing edge, the trailing edge positioned between the first side and the second side, the first side further including at least one slot defined by a recessed wall and a slot tide wall, the slot side wall including an opening extending therethrough, the recessed wall extending between the opening and the trailing edge and tapered form the opening to the first side outer surface.

7. A method in accordance with claim 6 further comprising the step of attaching the airfoil to a platform.

8. A method in accordance with claim 7 wherein said step of attaching the airfoil to a platform further comprises the step of extending a fillet form the leading edge to the trailing edge to secure the airfoil to the platform.

9. A method in accordance with claim 8 wherein the airfoil is formed such that the first side slot is further defined by a second side wall, the second side wall extending from the opening to the trailing edge.

10. A method in accordance with claim 9 wherein the airfoil is formed such that the recessed wall is tapered from the opening to the fillet.

11. An airfoil core for a turbine blade, said core comprising:

at least one serpentine channel;

a wedge channel connected to said serpentine channel;

a plurality of fingers extending form said wedge channel; and a tab extending from one of said fingers.

12. An airfoil core in accordance with claim [1] *11* wherein said plurality of fingers includes a first finger, said tab located at said first finger and extending substantially perpendicular to said first finger.

13. An airfoil core in accordance with claim [1] *11* wherein said at least one serpentine channel includes a first serpentine channel and a second serpentine channel.

* * * * *

UNITED STATES PATENT AND TRADEMARK OFFICE

CERTIFICATE OF CORRECTION

PATENT NO. : RE 39,398 E
APPLICATION NO. : 10/858553
DATED : November 14, 2006
INVENTOR(S) : Danowski et al.

It is certified that error appears in the above-identified patent and that said Letters Patent is hereby corrected as shown below:

In Claim 1, column 4, line 61, delete "and trailing" and insert therefor -- said trailing --.

In Claim 1, column 4, line 62, between "second" and "wall" insert -- side --.

In Claim 6, column 5, line 30, delete "slot tide wall" and insert therefor -- slot side wall --.

In Claim 6, column 5, line 33, delete "tapered form the" and insert therefor -- tapered from the --.

In Claim 8, column 6, line 5, delete "fillet form the" and insert therefor -- fillet from the --.

In Claim 11, column 6, line 18, delete "extending form said" and insert therefor -- extending from said --.

Signed and Sealed this

Twenty-sixth Day of February, 2008

JON W. DUDAS
*Director of the United States Patent and Trademark Office*